US006460342B1

(12) United States Patent
Nalim

(10) Patent No.: US 6,460,342 B1
(45) Date of Patent: Oct. 8, 2002

(54) WAVE ROTOR DETONATION ENGINE

(75) Inventor: Mohamed Razi Nalim, Indianapolis, IN (US)

(73) Assignee: Advanced Research & Technology Institute, Indianapolis, IN (US)

( * ) Notice: Subject to any disclaimer, the term of this patent is extended or adjusted under 35 U.S.C. 154(b) by 0 days.

(21) Appl. No.: 09/558,704

(22) Filed: Apr. 26, 2000

Related U.S. Application Data
(60) Provisional application No. 60/131,069, filed on Apr. 26, 1999.

(51) Int. Cl.$^7$ ................................................. F02G 3/00
(52) U.S. Cl. ........................................ 60/772; 60/39.45
(58) Field of Search ............................. 60/39.45, 776, 60/772

(56) References Cited

U.S. PATENT DOCUMENTS

| | | | |
|---|---|---|---|
| 2,399,394 A | | 4/1946 | Seippel |
| 2,705,867 A | | 4/1955 | Lewis |
| 3,931,553 A | | 1/1976 | Stich |
| 4,500,260 A | | 2/1985 | Mayer |
| 4,646,704 A | | 3/1987 | Gora |
| 4,719,746 A | | 1/1988 | Keller |
| 4,744,213 A | | 5/1988 | El-Nashar |
| 4,860,547 A | | 8/1989 | Maldague |
| 4,887,942 A | * | 12/1989 | Hauge ..................... 417/64 |
| 4,924,637 A | | 5/1990 | Ikimi |
| 5,154,583 A | | 10/1992 | Althaus |
| 5,197,276 A | | 3/1993 | Keller |
| 5,267,432 A | | 12/1993 | Paxson |
| 5,274,994 A | | 1/1994 | Chyou |
| 5,297,384 A | | 3/1994 | Paxson |
| 5,338,158 A | | 8/1994 | Hauge |
| 5,381,653 A | | 1/1995 | Althaus |
| 5,513,489 A | | 5/1996 | Bussing |
| 5,522,217 A | | 6/1996 | Zauner |
| 5,894,719 A | | 4/1999 | Nalim |
| 5,916,125 A | | 6/1999 | Snyder |

FOREIGN PATENT DOCUMENTS

WO          WO00/68566       11/2000

OTHER PUBLICATIONS

Kentfield, J.A.C., "Circumferential Cell–Dividers in Wave–Rotors," 34$^{th}$ AiAA/ASME/SAE/ASEE Joint Propulsion Conference & Exhibit, Cleveland, OH, AIAA98–3397, Jul. 13–15, 1998.

Nalim, M, Razi, "Pulse Combustion and Wave Rotors for High–Speed Propulsion Engines," 8$^{th}$ International Space Planes and Hypersonic Systems and Technologies Conference, Norfolk, VA, Apr. 27–30.

Nalim, M. Razi, "Numerical Study of Stratified Charge Combustion in Wave Rotors," 33$^{rd}$ AIAA/ASME/SAE/ASEE Joint Propulsion Conference and Exhibit, Seattle, WA, AIAA–97–3141, Jul. 6–9, 1997.

(List continued on next page.)

*Primary Examiner*—Charles G. Freay
(74) *Attorney, Agent, or Firm*—Dann, Dorfman, Herrell & Skillman, P.C.

(57) ABSTRACT

A wave rotor detonation engine and method are provided. The wave rotor detonation engine includes a rotor rotatably mounted within a housing, an inlet port, an exhaust port, and an igniter for igniting the gases within the rotor. The rotor includes a plurality of circumferentially spaced longitudinally extending combustion chambers in which detonative combustion occurs. The inlet port has a plurality of separate inlet zones for supplying fuel and air mixtures to the inlet end of the rotor. The inlet zones are circumferentially spaced about the perimeter of the rotor so that the combustion chambers interact with these inlet zones sequentially. Each inlet zone is capable of introducing a different combustible mixture sequentially to a given combustion chamber as it rotates past the inlet zones. This results in the stratification of differing concentrations of combustible material within the combustion chambers which is particularly suited to create detonative combustion within the wave rotor.

116 Claims, 12 Drawing Sheets

OTHER PUBLICATIONS

Bussing, T.R.A., "A rotary Valve Multiple Pulse Detonation Engine (RVMPDE)", 31$^{st}$ AIAA/ASME/SAE/ASEE Joint Propulsion Conference and Exhibit, San Diego, CA, AIAA95–2577, Jul. 10–12, 1995.

Goldstein, et al., "Ideal Performance of Valved–Combustors and Applicability to Several Engine Types," Trans. of the American Society of Mechanical Engineers, 80, Jul. 1958, pp. 1027–1036.

Nalim, et al., "A Numberical Investigation of Premixed Combustion in Wave Rotors," 41$^{st}$ Gas Turbine and Aeroengine Congress sponsored by the International Gas Turbine Institute of the American Society of Mechanical Engineers, Birmingham, United Kingdom, Jun. 10–13, 1996.

Berchtold, et al., "Supercharging with Comprex. Application and Experience," cite unknown.

Comprex, "The Comprex Pressure Wave Supercharger . . . " Informative advertisement from Comprex AG, CH–5507 Melligen, Switzerland.

Schapker, R. L., "Analysis of a Wave Combustor Designed for Time–Steady Inlet and Discharge Conditions," AGT—Technical Information Series No. DF58AGT387, Flight Propulsion Laboratory Department, Aircraft Gas Turbine Division, General Electric, Cincinnati, Ohio, Jun., 1958.

Nalim, M. R., "Assemssment of Combustion Modes for Internal Combustion Wave Rotors" Journal of Engineering for Gas Turbines and Power, Apr. 1999, vol. 121, pp. 265–271.

Vickers Catalog, "Comprex, the pressure wave supercharger" advertisement for Model CX 93.

* cited by examiner

WAVE ROTOR DETONATION ENGINE

Applicants claim the benefit of priority of U.S. Provisional Application 60/131,069, filed on Apr. 26, 1999, the entire contents of which are incorporated herein by reference.

FIELD OF THE INVENTION

The present invention relates generally to an internal combustion wave rotor employing detonative combustion for use as a direct thrust device.

BACKGROUND OF THE INVENTION

Combustion engines offering superior performance, especially high levels of thrust, are highly desirable for use in flight vehicle propulsion. In particular great demand exists for combustion engines suitable for accelerating a vehicle to hypersonic speeds. Many useful missions exist for air-breathing hypersonic propulsion requiring efficiency over a wide range of Mach numbers (0–8). It is highly desirable that the engine retain propulsive thrust both at hypersonic speeds and at lower speeds useful for takeoff so that the engine may be used both to initiate flight as well as maintain flight and cruising speeds. It is further desirable to achieve these results utilizing combustion which does not require high-frequency ignition, complex valving arrangements, cyclically loaded moving parts, and nonsteady inlet and jet-nozzle flows. Minimizing $NO_x$ emissions is also desirable.

The present invention addresses these concerns by providing an intermittent-combustion detonation engine without the need for high frequency pulsed ignition. The invention further eliminates the use of moving parts that transmit load for better durability and reduced engine vibration. The invention also eliminates specialized valving to create varying air-fuel mixtures for purging, firing, and igniting the combustion chamber. The present invention also minimizes losses and noise due to non-steady flow in the propulsive fluid flows outside the combustion chamber. Accordingly, this invention results in a flight propulsion engine with many desirable superior features including: essentially steady, low-loss inlet and nozzle flows; high frequency operation without pulsed ignition; and no moving parts that transmit thrust.

SUMMARY OF THE INVENTION

A wave rotor detonation engine is provided to create motive thrust without the need for a compressed air source or a downstream turbine. The wave rotor detonation engine is an on-rotor combustion device where the combustion process occurs within the combustion chambers of the rotor.

To generate sufficient thrust, the wave rotor detonation engine creates detonative combustion within the channels of the rotor. The wave rotor detonation engine includes a housing, one or more inlet ports in the housing, one or more exhaust ports in the housing, a rotor rotatably mounted within the housing, one or more igniters, and a motor for rotating the rotor. The rotor includes a plurality of combustion chambers in which detonative combustion occurs. The combustion chambers extend longitudinally relative to the rotational axis of the rotor. Each combustion chamber has an inlet end for communication with the inlet port and has an outlet end for communication with the exhaust port.

To promote the creation of detonative combustion, a plurality of separate inlet zones may be provided for supplying fuel and air mixtures to the inlet end of the rotor. The inlet zones are circumferentially spaced about the perimeter of the rotor so that the combustion chambers interact with these inlet zones sequentially. A fuel injector is provided in selected inlet zones for injecting fuel into each respective zone. Each inlet zone is capable of introducing a different combustible mixture sequentially into a given combustion chamber as the chamber rotates past the respective inlet zone. For example, a first inlet zone may be provided for providing an input of air, without fuel, into the chamber. As the chamber in the rotor moves into registry with a second inlet zone, a fuel or fuel mixture may be input into the chamber. Additional inlet zones may be provided for successively inputting additional fuel or fuel mixtures which may be different from other fuels or fuel concentrations, into the chamber. Another inlet zone, such as the last inlet zone, may input a combustion enhancer or a mixture of fuel and the combustion enhancer into the combustion chamber proximal to the source of ignition to enhance detonative combustion. Using successive inlet zones results in the stratification of differing concentrations of combustible material within the combustion chambers.

For purpose of inputting a combustion enhancer into the combustion chamber, an enhancement injector for injecting a combustion enhancer into the respective combustion chamber is provided. Preferably, a combustion enhancer such as an oxidant is used in the inlet zone proximate to the igniter. After ignition, the combustion materials may be exhausted from the combustion chamber through the exhaust port. The chamber is successively charged, as desired, to have a mixture highly susceptible to initiation of detonative combustion.

In the alternate configuration, as shown in FIG. 5, having two inlet ports 32 and two exhaust ports 34, each port subtends a circumferential extent of about 90 degrees, and each inlet port 32 and paired exhaust port 34 is circumferentially offset from one another by about 45 degrees. Additional configurations having more inlet and exhaust ports and having the same relative proportions and locations are possible. In an alternate configuration, as shown in FIG. 8, the wave rotor detonation engine 10 may have one exhaust port 34 which subtends a full annulus of 360 degrees (the exhaust port 34 is in simultaneous communication with all of the combustion chambers 12) and may have one or more inlet ports 32 that subtend a total combined circumferential extent of about 240 degrees thereby communicating with about two-thirds of the combustion chambers 12.

The length of the rotor channels, the circumferential width of the inlet and exhaust ports, the placement of the exhaust port relative to the input port, and the rotational speed of the rotor are designed to control the cyclic flow processes, wave processes, and combustion processes to support detonative combustion within the wave rotor detonation engine. A CPU or electronic control system is optionally provided to control the rates of the rotor rotation, fuel injection, and ignition.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
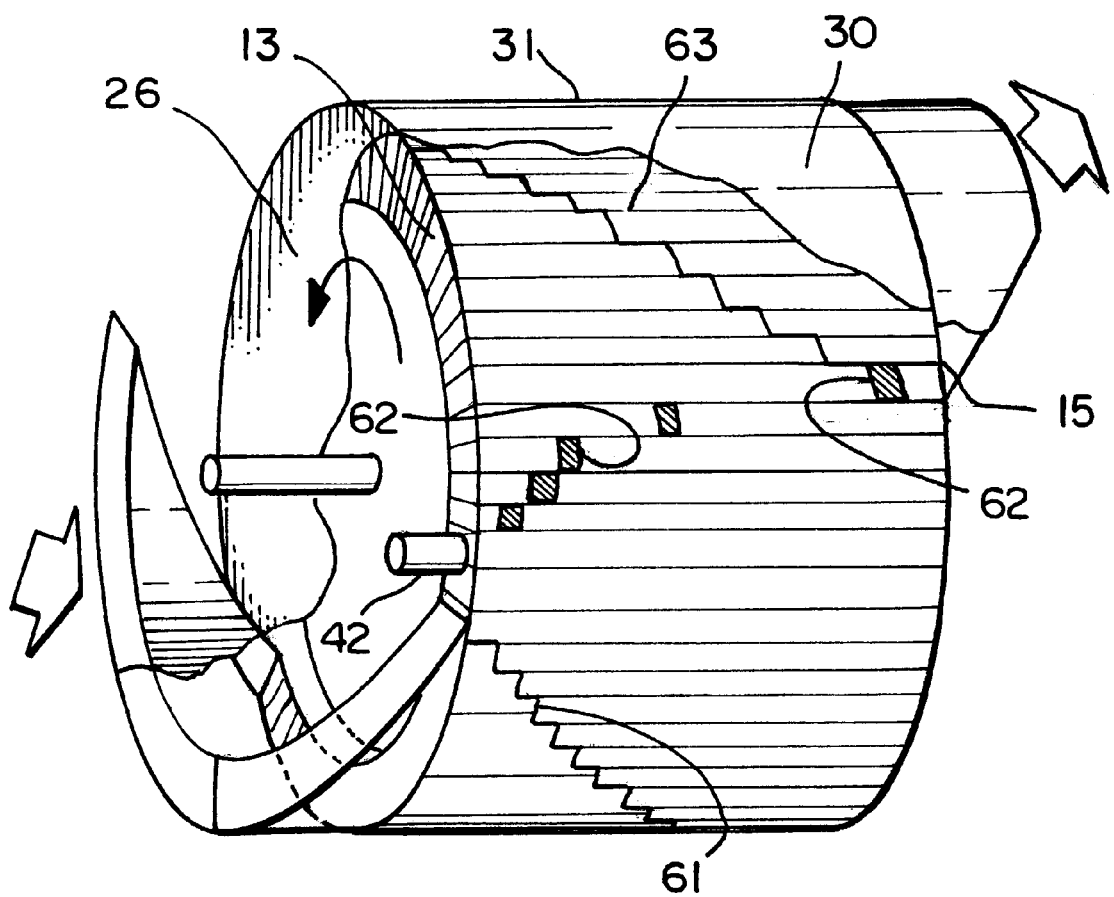
FIG. 1 illustrates a perspective view of a wave rotor detonation engine broken away in part to reveal combustion channels.
Figure 2:
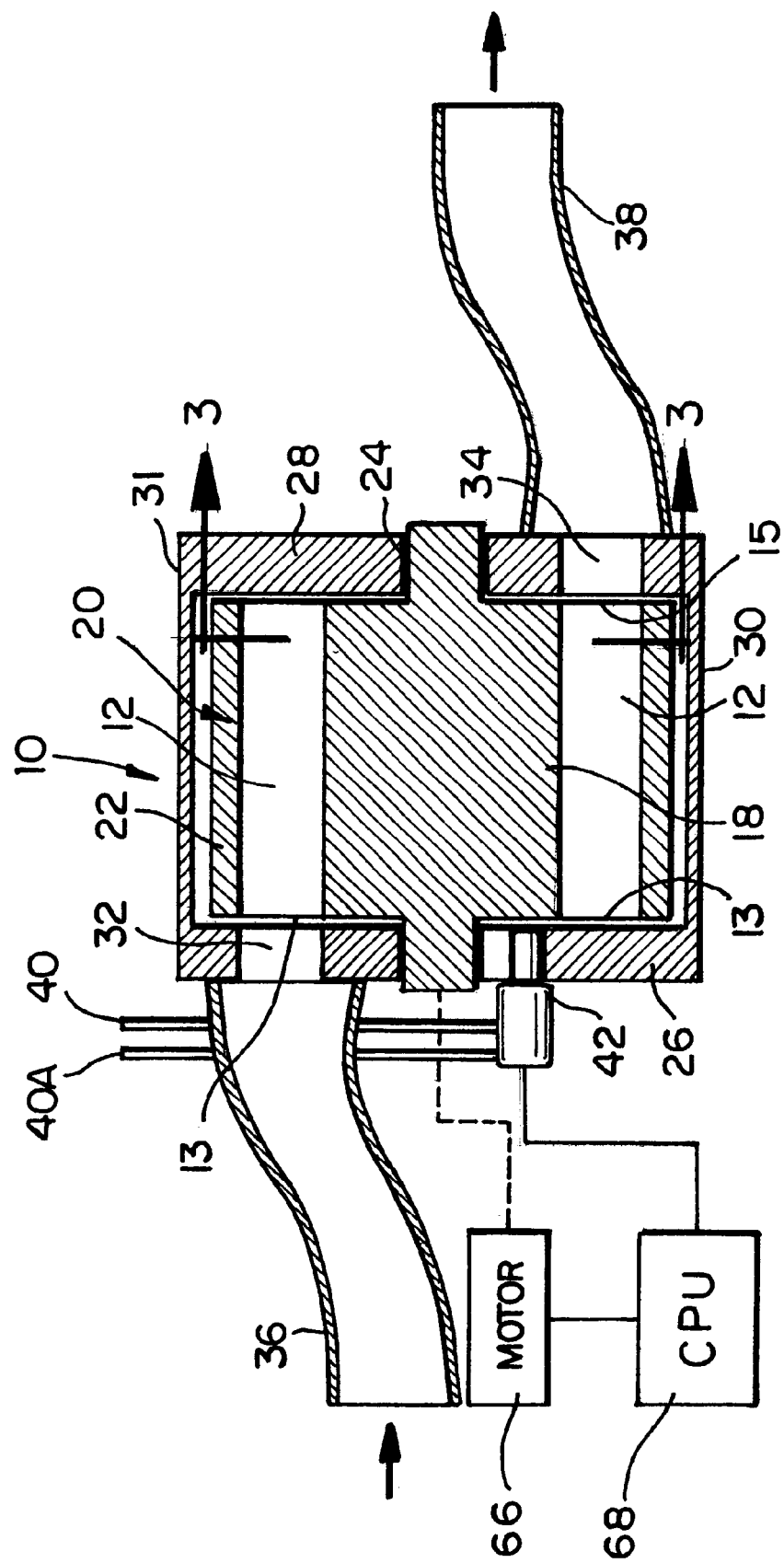
FIG. 2 illustrates a schematic side elevational view in partial cross section of the wave rotor detonation engine depicted in FIG. 1 showing the wave rotor and its housing in axial cross section.
Figure 3A:
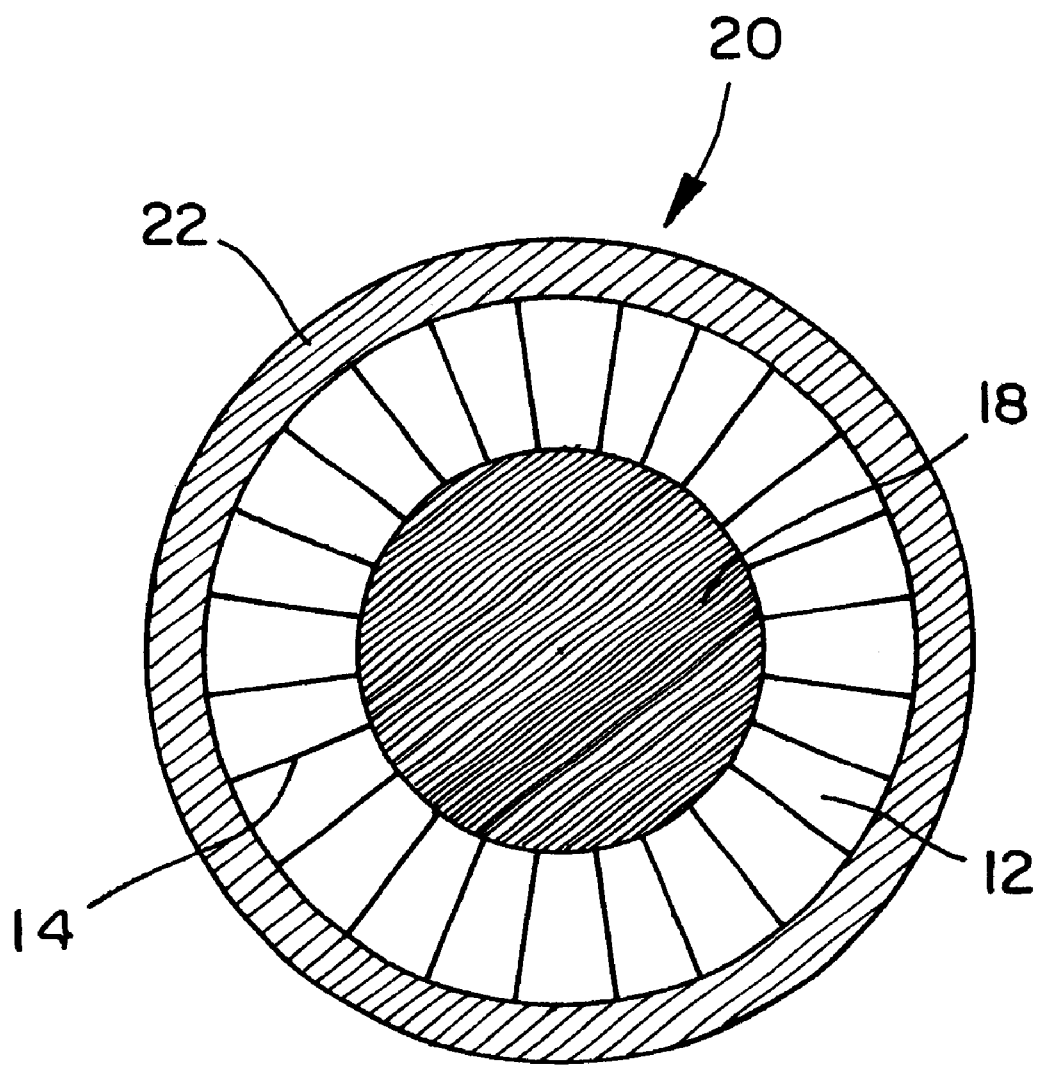
FIG. 3A illustrates a schematic transverse cross-sectional view taken along 3—3 in FIG. 2.
Figure 3B:
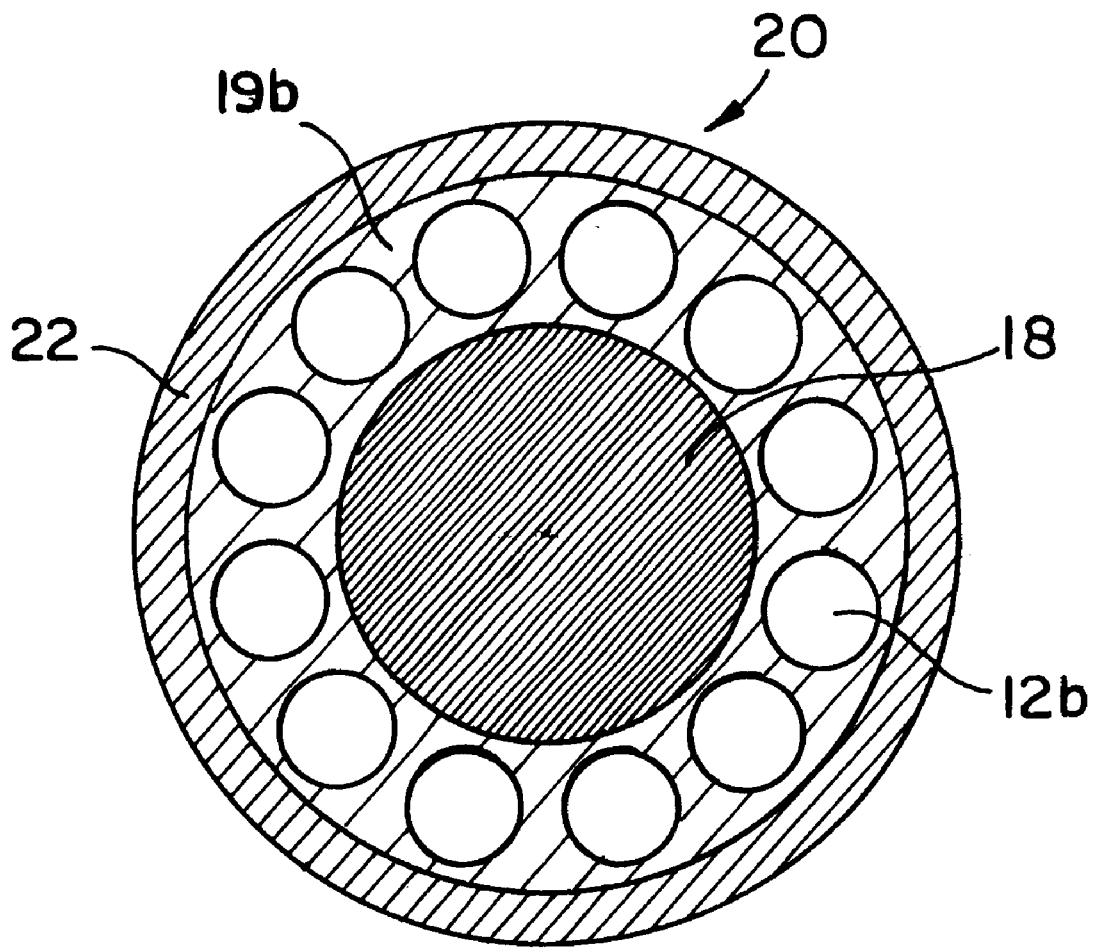
FIGS. 3B–E illustrate schematic traverse cross-sectional views, similar to FIG. 3A, showing alternate embodiments of rotors having different combustion channel shapes.
Figure 3C:
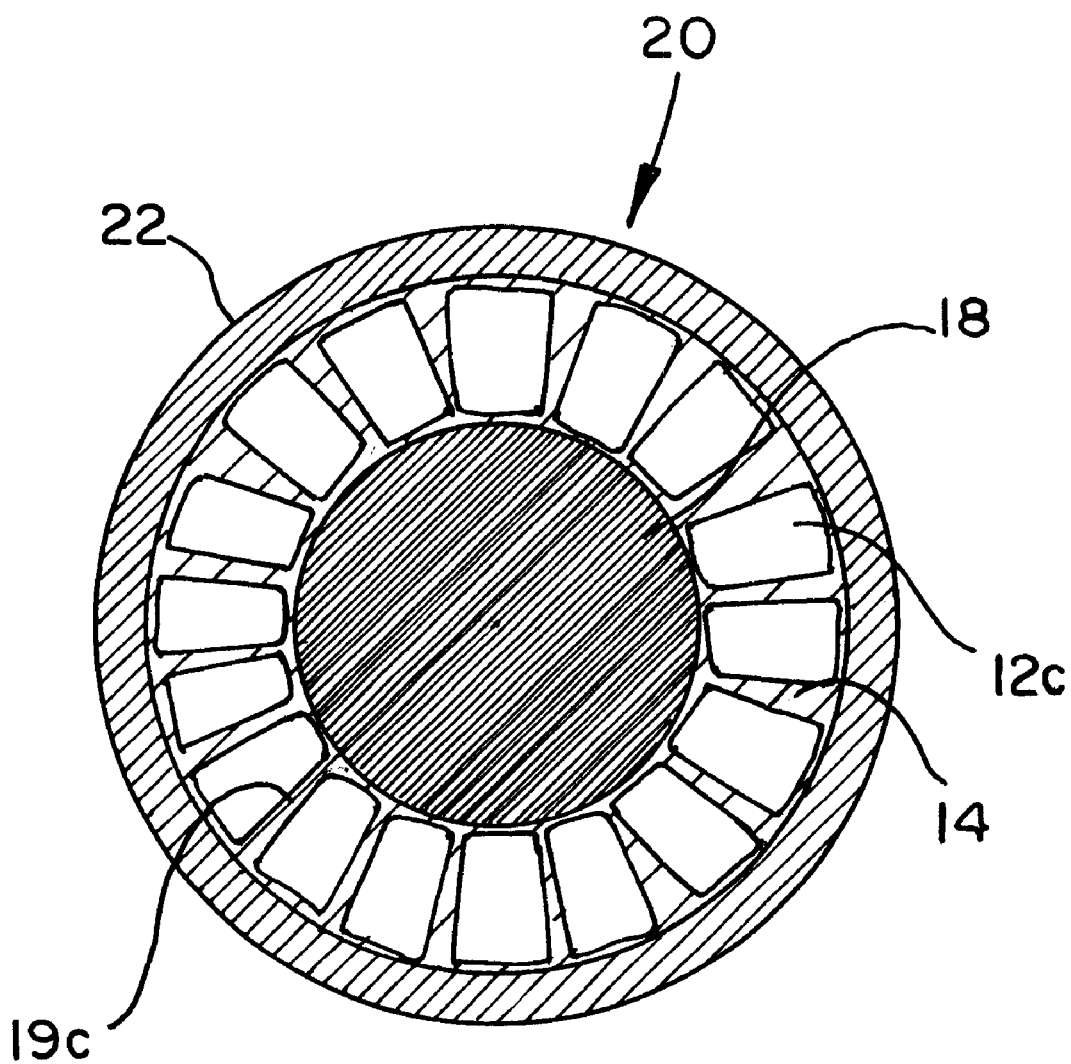

Referring now to the drawings, wherein like numerals indicate like elements, FIGS. 1 and 2 illustrate a wave rotor detonation engine 10. The wave rotor detonation engine 10 includes a rotor 20 rotatably mounted on bearings 24 within a housing 31. The rotor 20 includes a central hub 18, an outer shroud 22, and a plurality of circumferentially-spaced, longitudinally extending elongated combustion chambers 12 disposed between the central hub 18 and the outer shroud 22 as shown in FIGS. 3A–3C. Detonative combustion is conducted in the combustion chambers 12 to produce direct thrust by the wave rotor detonation engine 10. The combustion chambers 12 are open at each end of the rotor 20 permitting an inflow of combustion reactants at inlet ends 13 of the combustion chambers 12 and an outflow of the combustion products at outlet ends 15 of the combustion chambers 12.

Figure 6:
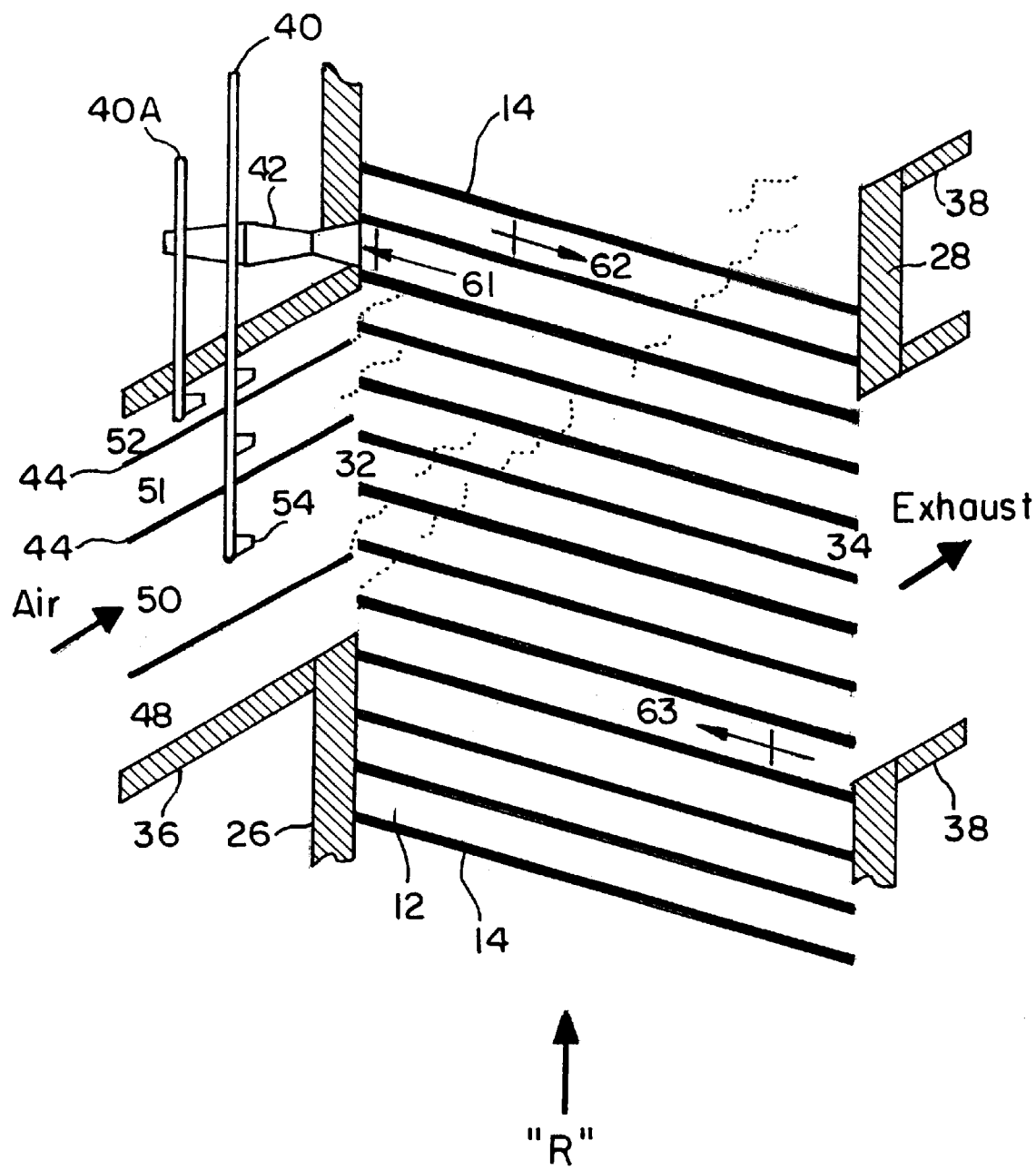
FIG. 6 illustrates a schematic developed view of a wave rotor detonation engine having helical combustion chambers.

The combustion chambers 12 are formed by vanes 14 extending radially from the hub 18 to the outer shroud 22 as shown in FIG. 3A, so that the combustion chambers 12 extend longitudinally through the rotor from the inlet end 13 to the outlet end 15. The radial vanes 14 may be straight, as shown in FIG. 3A, or may be curved, as shown, for example, in FIG. 6. The curved vanes 14 may be helically curved to create combustion chambers 12 that are helically disposed with respect to a longitudinal axis of the rotor 20, as shown in FIG. 6.

In an alternate configuration, as shown in FIG. 3B, the combustion chambers 12b may be cylindrical in shape having a circular cross section. The chambers 12b are disposed side-by-side in an annular member 19b disposed between the hub 18 and outer shroud 22.

In another alternate configuration, as shown in FIG. 3C, the combustion chambers 12c have a cross section that is generally rectangular with rounded corners. The chambers 12c are disposed side-by-side in an annular region 19c between the hub 18 and outer shroud 22.

Figure 3D:
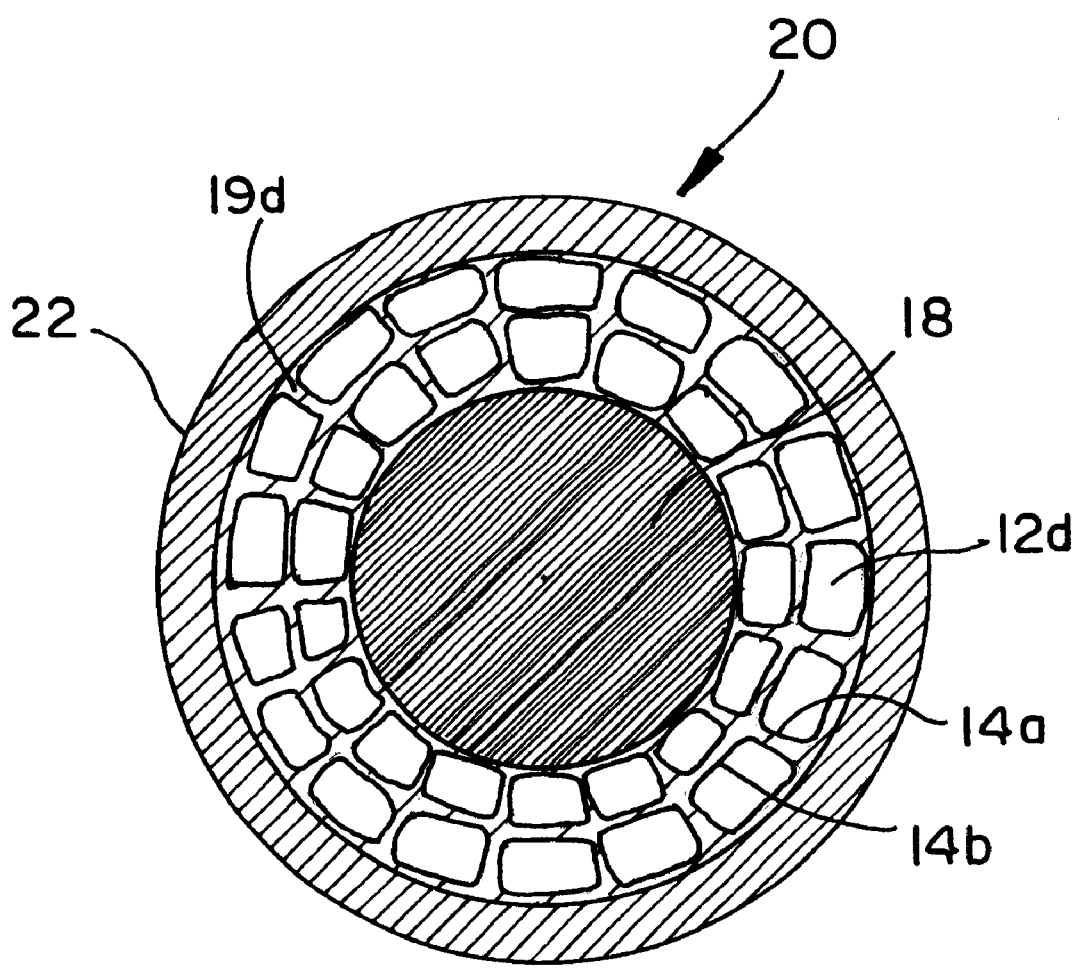

In another alternate configuration, as shown in FIG. 3D, the combustion chambers 12d also have a cross section that is generally rectangular with rounded corners. However, the chambers 12d are stacked in the radial direction to provide two annular rows of chambers 12d in an annular region 19d disposed between the hub 18 and the outer shroud 22. The chambers 12d may be stacked in alignment so that a chamber in the inner annular row is positioned radially inward from a corresponding chamber in the outer annular row whereby a stacked pair of chambers is provided in the radial direction. Each stacked pair of chambers would circumferentially adjoin other stacked pairs of chamber 12d. The chambers in the outer row may be in registration with their neighboring chambers in the inner row, such that the chambers share common radial and circumferential vanes 14a and 14b. Alternately, however, the combustion chambers 12d in the outer row may be staggered with respect to neighboring combustion chambers 12d in the inner row.

Figure 3E:
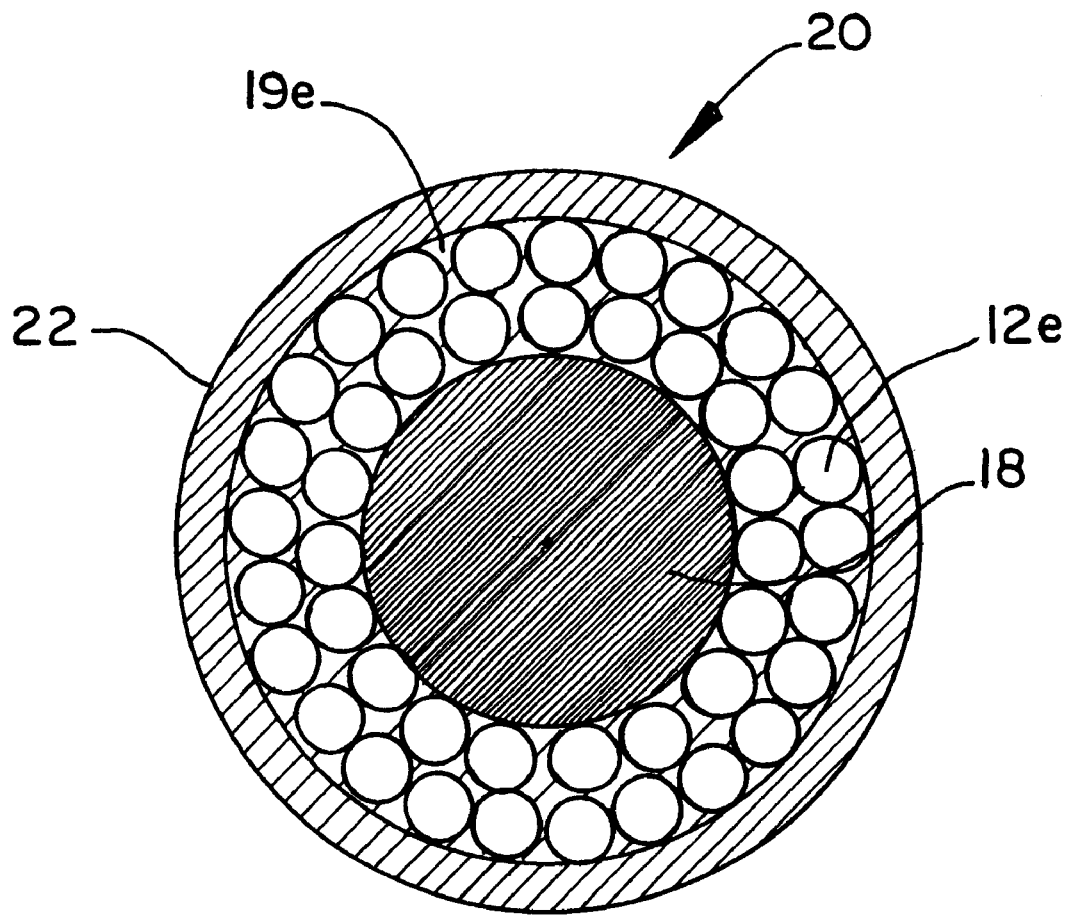

In still another alternative configuration, as shown in FIG. 3E, the combustion chambers 12e have a cross section that is circular. However, the combustion chambers 12e are stacked in inner and outer annular rows in the annular region 19e between the hub 18 and outer shroud 22. As shown in FIG. 3E, the chambers in the inner row may be offset from chambers in the outer row or the chambers in the inner and outer rows may be positioned in alignment with one another.

Other combustion chamber cross sectional shapes are possible, and more than two annular rows of combustion chambers may be used. Preferably, the radial height of the annular region containing the combustion chambers 12 is 20% to 40% of the rotor radius. Preferably, 15 to 30 chambers are disposed about the circumference of a given annular region.

The rotor 20 and housing 31 are formed of metal or other materials known in the manufacture of wave rotors. However, the materials of the wave rotor 20, housing 31, and vanes 14 for use in the wave rotor detonation engine 10 must be chosen to withstand the detonative combustion process. Preferably, the vanes 14 are integrally formed with the hub 18 and shroud 22. The combustion chambers 12 may be formed by removal of material, such as by boring the combustion chambers 12b. Alternately, the rotor 20 and combustion chambers 12 may be formed by an extrusion process. Further, the rotor 20 may be formed by binding together individual structures to provide the desired shape of the combustion chambers 12, for example tubes in the case of combustion chambers 12 having a circular cross section, and then filling the interstitial space between the individual structures.

Figure 4:
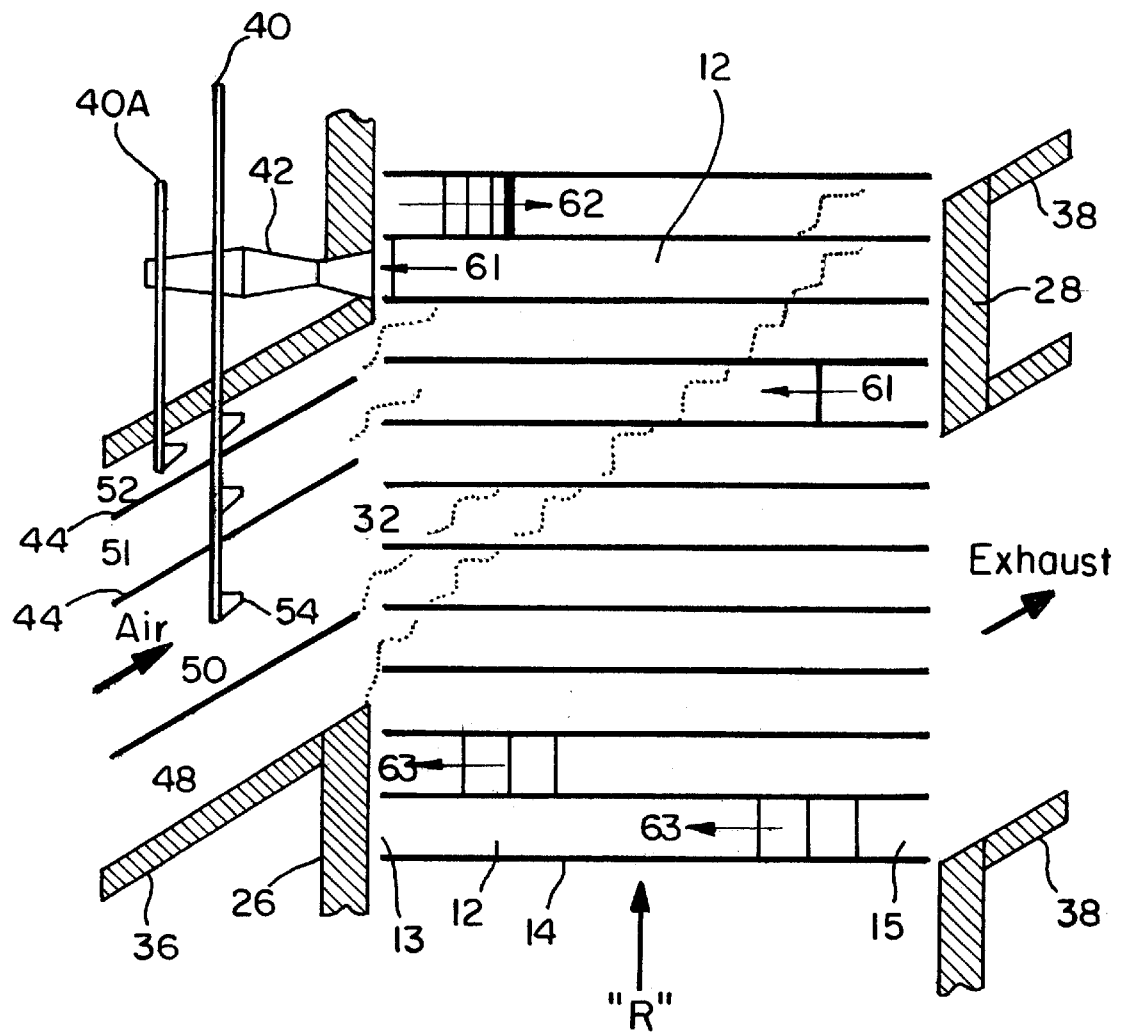
FIG. 4 illustrates a schematic developed view of the wave rotor and the external structure of the wave rotor detonation engine of FIG. 2.
Figure 5:
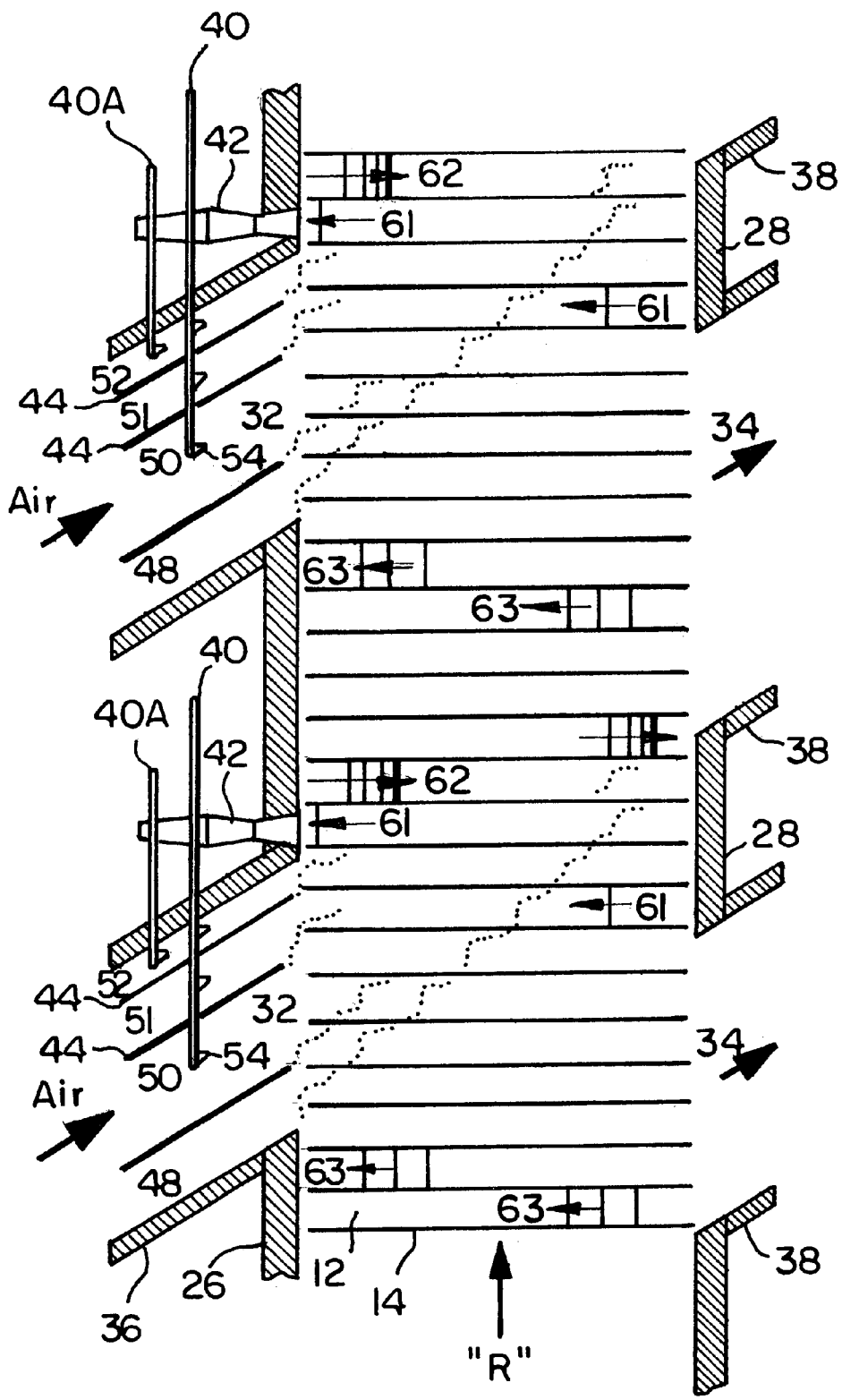
FIG. 5 illustrates a schematic developed view of a wave rotor detonation engine having two inlet ports and two exhaust ports.

The housing 31 is in the form of a cylindrical casing 30 having a first circular disc-shaped end wall 26 and a second circular disc-shaped end wall 28. The end walls 26, 28 have a central cylindrical aperture for holding the bearings 24 that rotatably receive the rotor shaft 21. The end walls 26, 28 each have partial-annular ports 32, 34 to allow gases to be admitted to or expelled from the combustion chambers 12. As shown in FIGS. 1, 2 and 4, the first end wall 26 has one inlet port 32 connected to an inlet duct 36, and the second end wall 28 has one exhaust port 34 connected to an exhaust duct 38. In an alternate configuration, as shown in FIG. 5, the wave rotor detonation engine 10 may have two inlet ports 32 and two exhaust ports 34. The use of two inlet ports 32 and two exhaust ports 34 permits better balancing of the thrust and mechanical loads. Even greater numbers of inlet and exhaust ports may be used. Preferably, the number of inlet ports equals the number of exhaust ports.

The relative circumferential locations of these ports are to be determined primarily by calculation of the rates of physical and chemical processes in the gas in the combustion chambers, including the speeds of pressure waves and the combustion chemical rates. These calculations taken together with the length and rotation speed of the rotor 20 provide estimates of the time required for transit of waves and the ignition delay time for initiation of the detonation wave, in terms of circumferential displacement of the rotor.

FIG. 4 is a developed view showing the wave rotor detonation engine 10 taken through the combustion chambers 12. The partial-annular ports 32, 34 are shown in circumferential section. The combustion chambers 12 appear as a horizontally stacked array, and the rotation of the combustion chambers appears as translation along the direction "R". The combustion chambers 12 move from the bottom to the top of the figure upon rotation. For simplicity, the schematic diagram of FIG. 4 illustrates the configuration of this invention designed for only one combustion cycle per revolution having only one inlet port 32 and one exhaust port 34. FIG. 5 illustrates a preferred configuration having two inlet ports 32 and two exhaust ports 34. FIG. 6 illustrates a preferred configuration where the combustion chambers 12 are helically disposed with respect to a longitudinal axis of the rotor 20. In a developed view, as shown in FIG. 6, the pitch of the helix of the combustion chambers 12 is represented by the slope of the combustion chamber walls. In a preferred helical configuration, the pitch of the helix is such that combustion chambers 12 are slanted downward from the inlet port 32 towards the exhaust port 34 in a developed view, where the direction of rotation is in the upward direction.

In the configuration containing one inlet port 32 and one exhaust port 34, as shown in FIG. 4, the inlet port 32 and exhaust port 34 each has a circumferential extent subtending about 180 degrees. Each port respectively communicates with one-half of the combustion chambers 12 at any instance. Preferably, the inlet port 32 is circumferentially offset by about 90 degrees downstream with respect to the rotation direction "R" from the exhaust port 34. In general, it is preferred that an inlet port 32 and paired exhaust port 34, having substantially equal circumferential extent, are circumferentially offset from one another by about one-half of their circumferential extent, with the inlet port 32 being downstream from the exhaust port 34.

In the alternate configuration, as shown in FIG. 5, having two inlet ports 32 and two exhaust ports 34, each port subtends a circumferential extent of about 90 degrees, and each inlet port 32 and paired exhaust port 34 is circumferentially offset from one another by about 45 degrees. Additional configurations having more inlet and exhaust ports and having the same relative proportions and locations are possible. In an alternate configuration, the wave rotor detonation engine 10 may have one exhaust port 34 which subtends a full annulus of 360 degrees (the exhaust port 34 is in simultaneous communication with all of the combustion chambers 12) and may have one or more inlet ports 32 that subtend a total combined circumferential extent of about 240 degrees thereby communicating with about two-thirds of the combustion chambers 12.

An inlet duct 36 for receiving air and delivering air and combustible material to the inlet port 32 is connected to the first end wall 26, communicating with the inlet port 32. An exhaust duct 38 for discharging combustion products is connected to the second end wall 28, communicating with the exhaust port 34. Preferably, the inlet duct 36 is designed to receive air at atmospheric pressure. The inlet duct 36 may be attached perpendicular to the first end wall 26. Alternately, the inlet duct 36 may be attached to the first end wall 26 at an angle as shown in FIGS. 4 and 5.

As shown in FIGS. 4, 5 and 6, the inlet duct 36 is partitioned into several inlet zones 48, 50, 52 for pre-mixing air and combustible materials of varying concentrations and introducing such materials into the combustion chambers 12 in a stratified manner. Inlet duct vanes 44 are disposed within the inlet duct 36 to create the inlet zones 48, 50, 52. Preferably at least three inlet duct vanes 44 are used creating at least four inlet zones 48, 50, 52. The inlet duct vanes 44 may be equally spaced within the inlet duct 36, thus creating inlet zones 48, 50, 52 of equal circumferential width. Alternatively, the inlet zone spacing may be unequal. In a selected configuration, the inlet zones have the same circumferential width as the circumferential width of the combustion chambers 12. The air and combustible materials are drawn into the combustion chambers 12 by the action of an expansion wave 63 which is discussed below in connection with the combustion cycle timing. The stratification is chosen to aid in establishing proper conditions for detonative combustion.

In particular, a first inlet zone 48 is located at a leading edge of the inlet port 32 such that the combustion chambers 12 encounter the first inlet zone 48 before any other inlet zones as the combustion chambers 12 rotate past the inlet port 32. The first inlet zone 48 preferably introduces air and no combustible materials into the inlet end 13 of a representative combustion chamber 12 forming a noncombustible region within the representative combustion chamber 12. This noncombustible region provides a buffer from any previously existing hot gases that may be present within the representative combustion chamber 12 thus inhibiting any subsequent combustible materials introduced into the representative combustion chamber 12 from prematurely igniting. The volume of air introduced into the representative combustion chamber 12, and thus the width of the buffer layer, is governed by the flow rate of air into the representative chamber 12 and the rate of rotor rotation relative to the circumferential width of the first inlet zone 48. The spacing of the inlet vane 44 that defines the circumferential width of the first inlet zone 48 is selected with regard to the rotor rotation rate and air flow rate to create a buffer layer of sufficient volume.

A first intermediate inlet zone 50 positioned adjoined the first inlet zone 48 includes a first fuel injector 54 for injecting fuel into the intermediate inlet zone 50. The first fuel injector 54 is fed by fuel line 40 which is connected to an appropriate fuel source such as a hydrocarbon fuel or hydrogen. The first intermediate inlet zone 50 is located adjacent to the first inlet zone 48 such that the representative combustion chamber 12 will successively encounter the first intermediate inlet zone 50 after the first inlet zone 48, as determined by the direction of rotation R. Thus, the first intermediate inlet zone 50 delivers a combustible material to the representative combustion chamber 12 adjacent to the initial buffer layer. The concentration of combustible material delivered to the combustion chamber 12 is controlled by the discharge rate of fuel from first fuel injector 54. The volume of combustible material introduced into the representative combustion chamber 12 is governed by the flow rate of combustible material into the representative chamber 12 and the rate of rotor rotation relative to the circumferential width of the first intermediate inlet zone 50. The spacing of the inlet vane 44 that defines the circumferential width of the first intermediate inlet zone 50 is selected with regard to the rotor rotation rate and flow rate to create a combustion layer of sufficient volume.

The inlet duct 36 may also contain a second intermediate inlet zone 51 disposed adjacent to the first intermediate inlet zone 50. It contains a second fuel injector 54 connected to the fuel line 40. The second intermediate inlet zone 51 is configured to deliver a second combustible layer to the representative combustion chamber 12 as the representative combustion chamber rotates into registry with the second intermediate inlet zone 51. The configuration and design considerations of the second intermediate inlet zone 51 are analogous to the considerations of the first intermediate inlet zone 50 discussed above. Additional intermediate inlet zones may be used in the inlet duct 36 by the use of additional inlet duct vanes 44.

The last inlet zone 52 is located adjacent to the final intermediate inlet zone (the second intermediate inlet zone 51 in the configuration of FIG. 4) and adjacent to a trailing edge of the inlet port 32 such that the combustion chambers 12 encounter the last inlet zone 52 before the combustion chambers 12 rotate beyond the inlet port 32. The last inlet zone 52 includes a fuel injector 54 attached to the fuel line 40, the fuel injector 54 operating in a similar manner to the other fuel injectors 54. In addition, the last inlet zone 52 preferably includes an enhancement injector 56 attached to enhancer line 40A for injecting a combustion enhancer into the last inlet zone 52. Thus, the last inlet zone 52 introduces combustible materials along with a combustion enhancer into the inlet end 13 of the representative combustion chamber 12 forming a region particularly susceptible to detonative ignition. The combustion enhancer may be an oxidant, a fuel, or a chemical enhancer known for use in combustion processes. The quantity of combustible material introduced into the representative combustion chamber 12 is governed by the same considerations discussed above. In particular, the quantity and composition of the combustible material introduced by the last inlet zone 52 is designed to promote an ignition that causes detonative combustion.

The wave rotor detonation engine 10 further includes an igniter 42 preferably mounted in the first wall 26 proximal to the last inlet zone 52. Preferably, where there is more than one inlet port 32, separate igniters 42 are provided proximal to each inlet port 32, FIG. 5. A first preferred ignition device 42, as depicted in FIGS. 4 and 5, is a continuous-flow chemical reaction chamber similar to a rocket engine chamber. It is supplied with fuel from feed line 40 and with oxidant from feed line 40A. It may incorporate an injection nozzle designed for supersonic injection of hot gas deep into the main combustion chambers 12.

An alternative configuration of the ignition device 42 uses atmospheric air as an oxidant instead of a stored oxidant. Another configuration of the ignition device 42, applicable to a non-reusable flight vehicle, burns solid rocket fuel stored within the ignition device 42 to produce hot ignition gas for the main combustion chambers 12. Yet another configuration of the ignition device 42 generates a beam of electromagnetic radiation, including, but not limited to laser light or microwave radiation, which is focused into the rotating combustion chambers through a window in end wall 26 of the wave rotor detonation engine 10. As an alternative arrangement, the ignition device 42 may be located in the second wall 28 with the stratification scheme described above altered so that a region of combustible materials suited to ignite detonative combustion is located proximal to the outlet end 15 of the combustion chambers 12 at the second wall 28.

The wave rotor detonation engine 10 includes a motor 66 operably connected to the rotor 20 for rotating the rotor. Preferably the wave rotor detonation engine 10 includes a CPU 68 for operably controlling the fuel injectors 54, the motor 66, the igniter 42, and the enhancement injector 56. The CPU controls the operating speeds, flow rates, and timing of the applicable elements to control the detonative combustion process pursuant to the method of this invention.

Figure 7:
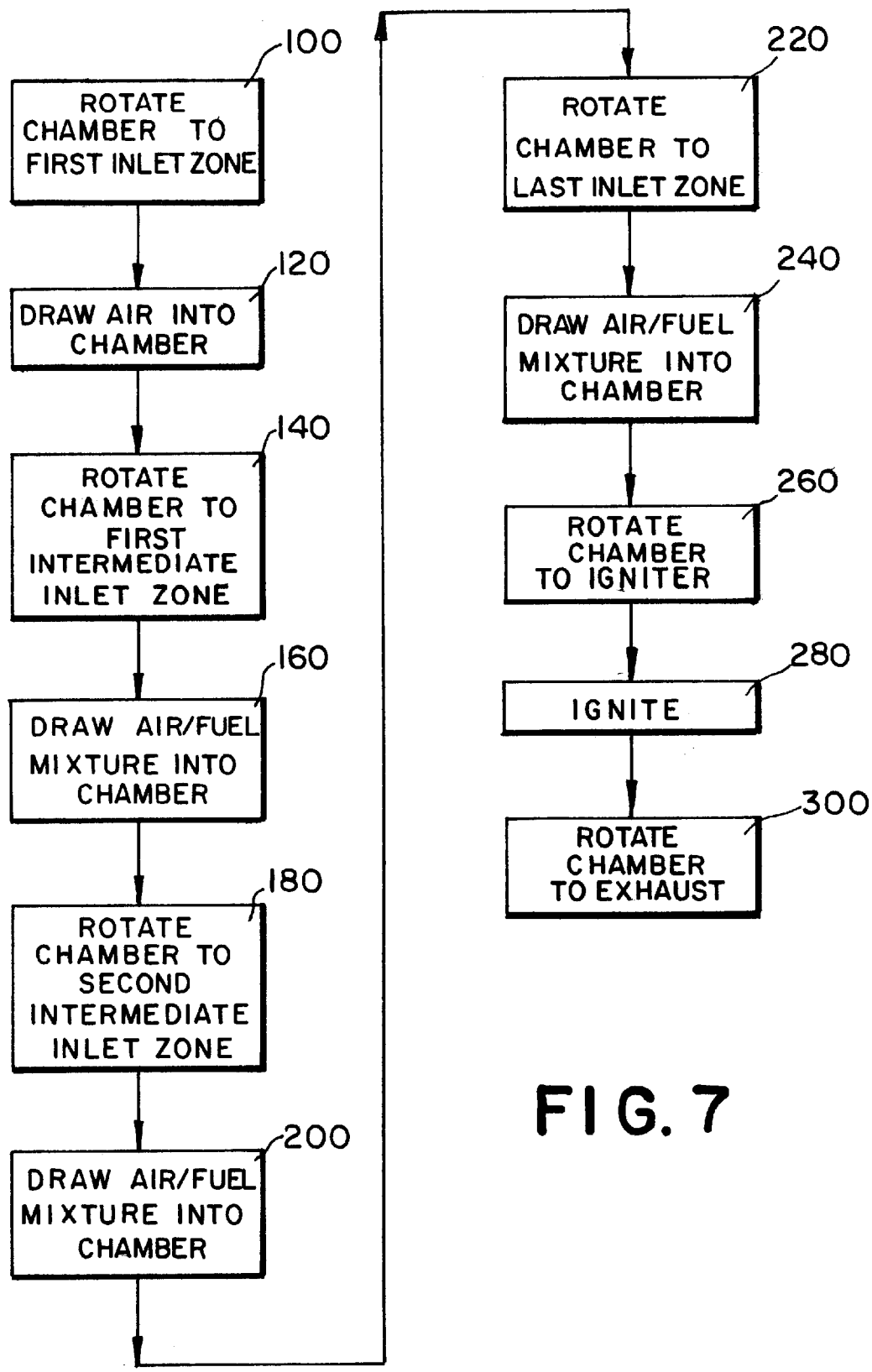
FIG. 7 illustrates a flowchart of a method of operation of a wave rotor detonation engine.
Figure 8:
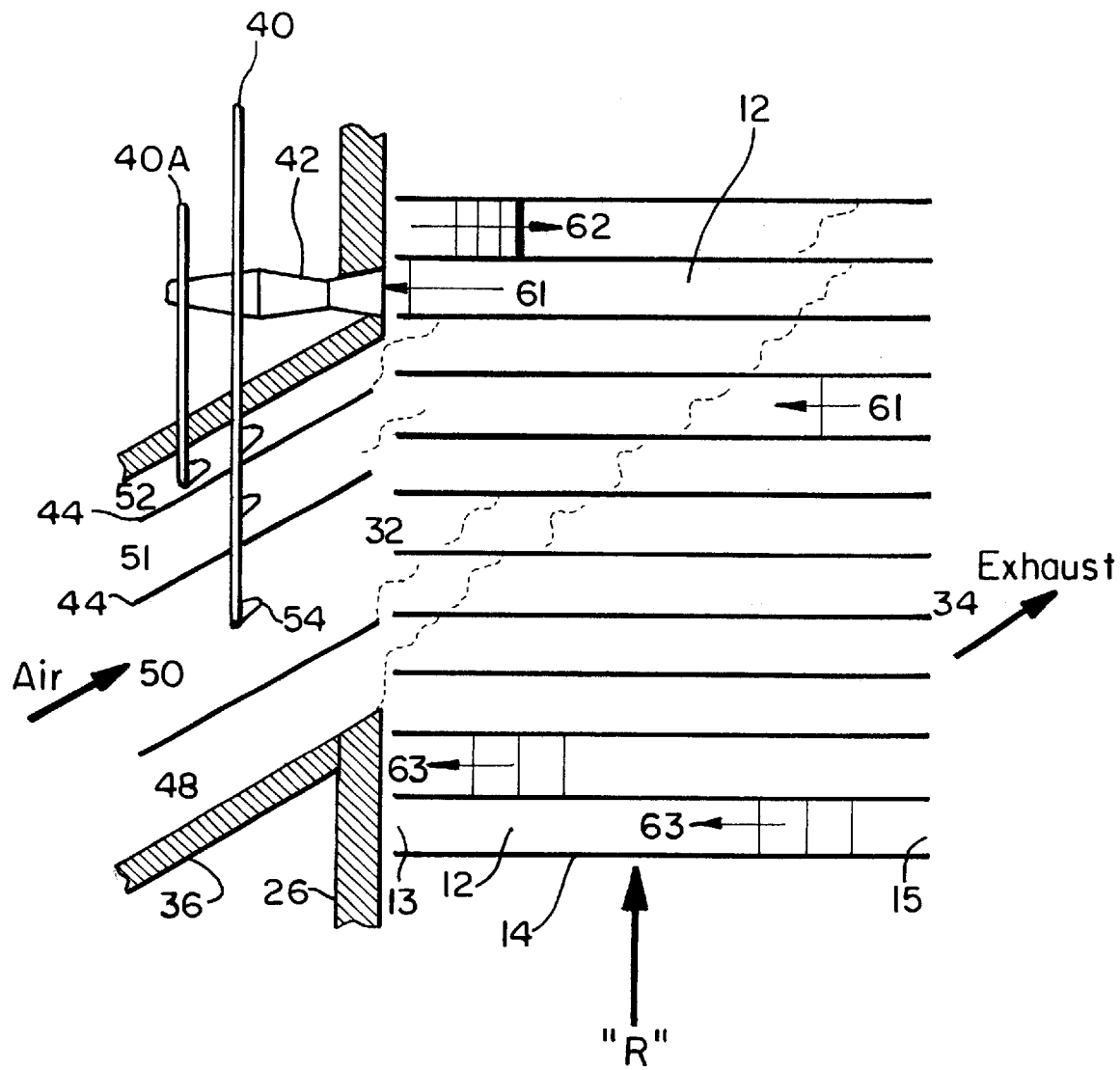
FIG. 8 illustrates a schematic developed view of a wave rotor where all of the combustion chambers are in simultaneous communication with the exhaust port.

The method for operating a wave rotor detonation engine 10 is schematically illustrated in the flow cycle diagram of FIG. 7 which corresponds to the configuration of the wave rotor shown in FIG. 4. For simplicity, the schematic diagram of FIG. 4 illustrates a canonical configuration of the invention having only one inlet port 32 and one exhaust port 34 and is designed for operation at one combustion cycle per revolution. In alternative arrangements, a wave rotor detonation engine may be provided that, in a single revolution of its rotor, completes multiple full cycles of combustion.

Beginning at the bottom of the diagram of FIG. 4, the internal processes and external interactions of a representative chamber 12 will be described, it being understood that all combustion chambers 12 experience the same processes sequentially and cyclically, but at different times. The pressurized, hot combustion gases produced by a previous detonation wave 62 exit from a combustion chamber 12 into the exhaust duct 38, resulting in an expansion wave 63 which travels from the outlet end 15 of the combustion chamber 12 towards the inlet end 13 of the combustion chamber 12. The expansion wave 63 arrives at the inlet end 13 of the combustion chamber 12 just as the combustion chamber 12 rotates into communication with the first inlet zone 48 of inlet port 32 at step 100 of FIG. 7. The resulting depression of pressure causes air to be drawn into the combustion chamber 12 from the first inlet zone 48 at step 120. The first inlet zone 48 contains air to create a sufficient buffer layer of non-reactive air within the combustion chamber 12 which inhibits the hot gases in the combustion chamber 12 from prematurely igniting subsequently admitted fuel-air mixtures. The volume of air drawn into the combustion chamber 12, defining the width of the buffer layer, is dictated by the flow rate of air into the combustion chamber 12 and the rate of rotor rotation relative to the circumferential width of the first inlet zone 48.

The rotor 20 continues its rotation bringing combustion chamber 12 into communication with the first intermediate inlet zone 50 at step 140. A first combustible mixture of fuel and air is drawn into the combustion chamber 12 from first intermediate inlet zone 50 at step 160. The combustible mixture is created by injecting a fuel through injector 54 from fuel line 40 into the first intermediate inlet zone 50. The concentration of combustible material delivered to the combustion chamber 12 is controlled by the discharge rate of fuel from the first fuel injector 54. The volume of combustible material introduced into the representative combustion chamber 12 is governed by the flow rate of combustible material into the representative chamber 12 and the rate of rotor rotation relative to the circumferential width of the first intermediate inlet zone 50.

The rotor 20 continues its rotation bringing the combustion chamber 12 into communication with the second intermediate inlet zone 51 at step 180. A second combustible mixture of fuel and air is drawn into the combustion chamber 12 from second intermediate inlet zone 51 at step 200. The concentration and quantity of combustible mixture produced is dictated by the same considerations discussed above in regard to the first intermediate inlet zone 50, except that the concentration and quantity of the combustion mixture produced at the second intermediate inlet zone 51 may be different relative to the first intermediate inlet zone.

The rotor 20 continues its rotation bringing the combustion chamber 12 into communication with the last inlet zone 52 at step 220. The last inlet zone 52 may preferably, in addition to mixing fuel and air, admix from feed line 40A a combustion enhancer such as an oxidant or another substance that can enhance the initiation of a detonation. This preferably enhanced mixture is drawn into the combustion chamber 12 at step 240.

The rotor 20 continues its rotation bringing the combustion chamber 12 into communication with the igniter 42 at step 260. Detonation in the chamber is initiated shortly after experiencing closure of the inlet port 32, at step 280, by injecting hot gases into the combustion chamber from an ignition device 42. The closure of the inlet port 32 momentarily produces a depression of pressure in the gases near the inlet end 13 of the combustion chamber 12 which will aid the injection of ignition gases. The combustible mixtures are ignited by an ignition device 42, thus producing a detonation wave 62 which combusts the mixtures and accelerates the gases in the combustion chambers towards the exhaust port 34. The detonation wave 62 produces a high level of gas pressure in the combustion chambers 12 that acts principally on the second end wall 26 and provides motive thrust to the flight vehicle to which the wave rotor detonation engine 10 is installed.

During an initial portion of the period of time that the combustion chamber 12 accepts inflowing mixtures from the inlet port 32, the combustion chamber 12 moves in registry with the exhaust port 34 communicating with the outlet end 15 of the combustion chamber 12. The abrupt closure of the outlet end 15 of the combustion chamber 12 causes a compression wave 61 to develop in the gas at the outlet end 15 of the combustion chamber 12. The compression wave 61 travels towards the inlet end 13 of the combustion chamber 12 and progressively causes inflowing gases to stop their motion towards the outlet end 15 of combustion chamber 12. The relative circumferential locations of the exhaust port 34 and ignition device 42 are arranged so that this compression 61 arrives at the first end wall 26 immediately after the injection of ignition gases. Reflection of the compression wave 61 off of the first end wall 26 accelerates the formation of the detonation wave 62, which combusts all the combustible mixtures in the combustion chamber 12 as the detonation wave 62 moves rapidly towards the second wall 28. The detonation wave 62 arrives at the outlet end 15 of the combustion chamber 12 as the combustion chamber 12 rotates into registry with the exhaust port 34 at step 300. The gases accelerated by the detonation wave 62 are expelled into the exhaust duct 38 to provide the jet thrust for the flight vehicle. Steps 100 through 300 are repeated cyclically and sequentially for each combustion chamber 12. As shown in FIG. 5, multiple combustion cycles can be effected for each single revolution of the rotor by providing multiple inlet and exhaust ducts 36 and 38, respectively.

These and other advantages of the present invention will be apparent to those skilled in the art from the foregoing specification. Accordingly, it will be recognized by those skilled in the art that changes or modifications may be made to the above-described configurations without departing from the broad inventive concepts of the invention. It should therefore be understood that this invention is not limited to the particular configurations described herein, but is intended to include all changes and modifications that are within the scope and spirit of the invention as set forth in the claims.

What is claimed is:

1. A wave rotor detonation engine comprising:
   a housing including a first wall having at least one inlet port and a second wall having at least one exhaust port;
   a rotor rotatably mounted within the housing, the rotor comprising a plurality of combustion chambers, the chambers each having an inlet end for gaseous communication with the at least one inlet port and an exhaust end for gaseous communication with the at least one exhaust port;
   a plurality of inlet zones disposed at the inlet port for communication with the inlet ends of the chambers, the inlet zones adapted to provide stratification of combustible materials within the chambers; and
   at least one igniter disposed within the housing for igniting a combustible material within the combustion chambers.

2. A wave rotor detonation engine according to claim 1 wherein the plurality of inlet zones comprises a first inlet zone comprising a fuel injector.

3. A wave rotor detonation engine according to claim 2 wherein the plurality of inlet zones comprises a second inlet zone being solely an air input without a fuel injector.

4. A wave rotor detonation engine according to claim 3 wherein the plurality of inlet zones comprises a third inlet zone intermediate to the first and second inlet zones, the third inlet zone having a fuel injector.

5. A wave rotor detonation engine according to claim 3 wherein the first inlet zone comprises an enhancement injector for delivering a combustion enhancer into a selected chamber in gaseous communication with the first inlet zone.

6. A wave rotor detonation engine according to claim 1 wherein the at least one inlet port has a first circumferential width and the at least one exhaust port has a second circumferential width, the first circumferential width and the second circumferential width being substantially equal.

7. A wave rotor detonation engine according to claim 1 wherein about ½ of the combustion chambers are in simultaneous gaseous communication with the at least one inlet port.

8. A wave rotor detonation engine according to claim 1 or 7 wherein about ½ of the combustion chambers are in simultaneous gaseous communication with the at least one exhaust port.

9. The wave rotor detonation engine according to claim 1 wherein about ¼ of the combustion chambers are in gaseous communication simultaneously with both the at least one exhaust port and the at least one inlet port.

10. A wave rotor detonation engine according to claim 1 wherein all of the combustion chambers are in simultaneous gaseous communication with the at least one exhaust port.

11. A wave rotor detonation engine according to claim 1 wherein the at least one inlet port subtends a circumferential width of about 180 degrees.

12. A wave rotor detonation engine according to claim 1 wherein the at least one exhaust port subtends a circumferential width of about 180 degrees.

13. A wave rotor detonation engine according to claim 1 wherein the at least one inlet port subtends a first circumferential width and the at least one exhaust port subtends a second circumferential width, the first circumferential width and the second circumferential width subtending a region of circumferential overlap of about 90 degrees.

14. A wave rotor detonation engine according to claim 1 wherein the at least one inlet port subtends a first circumferential width and the at least one exhaust port subtends a second circumferential width, the first circumferential width and the second circumferential width subtending a region of circumferential overlap of about ½ the first circumferential width.

15. A wave rotor detonation engine according to claim 14 wherein the first circumferential width is defined by a first leading-edge and a first trailing edge and the second circumferential width is defined by a second leading-edge and a second trailing edge, and wherein the region of overlap is disposed between the first leading-edge and the second trailing edge.

16. A wave rotor detonation engine according to claim 1 wherein the at least one inlet port subtends a circumferential width of about 90 degrees.

17. A wave rotor detonation engine according to claim 1 wherein the at least one exhaust port subtends a circumferential width of about 90 degrees.

18. A wave rotor detonation engine according to claim 1 wherein the at least one inlet port subtends a first circumferential width and the at least one exhaust port subtends a second circumferential width, the first circumferential width and the second circumferential width subtending a region of circumferential overlap of about 45 degrees.

19. A wave rotor detonation engine according to claim 1 wherein the number of inlet ports equals the number of exhaust ports.

20. A wave rotor detonation engine according to claim 1 having one inlet port and one exhaust port.

21. A wave rotor detonation engine according to claim 20 wherein the inlet port and the exhaust port each subtend a circumferential width of about 180 degrees.

22. A wave rotor detonation engine according to claim 21 wherein the inlet port circumferential width and the exhaust port circumferential width subtend a region of circumferential overlap of about 90 degrees.

23. A wave rotor detonation engine according to claim 1 having a first and a second inlet port and a first and a second exhaust port.

24. A wave rotor detonation engine according to claim 23 wherein each inlet port and each exhaust port subtends a circumferential width of about 90 degrees.

25. A wave rotor detonation engine according to claim 23 wherein the first inlet port and the first exhaust port subtend a region of circumferential overlap of about 45 degrees and the second inlet port and the second exhaust port subtend a region of circumferential overlap of about 45 degrees.

26. A wave rotor detonation engine according to claim 1 having one inlet port and one exhaust port, the exhaust port in simultaneous gaseous communication with all of the combustion chambers, the inlet port in simultaneous gaseous communication with about ⅔ of the combustion chambers.

27. A wave rotor detonation engine according to claim 1 wherein the at least one igniter comprises a hot gas source, an electromagnetic radiation source, a laser source, or a microwave radiation source, for igniting the combustible material.

28. A wave rotor detonation engine according to claim 1 wherein the number of igniters equals the number of inlet ports.

29. A wave rotor detonation engine according to claim 28 wherein each igniter is disposed proximate a respective inlet port such that each igniter communicates with the combustion chambers just after the combustion chambers have rotated past the respective inlet port.

30. A wave rotor detonation engine according to claim 1 wherein the number of igniters equals the number of exhaust ports.

31. A wave rotor detonation engine according to claim 30 wherein each igniter is disposed proximate a respective exhaust port such that each igniter communicates with the combustion chambers just after the combustion chambers have rotated past the respective exhaust port.

32. A wave rotor detonation engine according to claim 1 wherein the rotor comprises a cylindrical outer shroud defining an outer surface of the rotor, a cylindrical hub, and rotor vanes extending from the cylindrical hub to the outer shroud whereby the combustion chambers are formed.

33. A wave rotor detonation engine according to claim 1 wherein the combustion chambers have a substantially rectangular cross section in a plane containing a longitudinal axis of the rotor.

34. A wave rotor detonation engine according to claim 1 wherein the combustion chambers have a substantially rectangular cross section in a plane perpendicular to a longitudinal axis of the rotor.

35. A wave rotor detonation engine according to claim 1 wherein the combustion chambers have a substantially circular cross section in a plane perpendicular to a longitudinal axis of the rotor.

36. A wave rotor detonation engine according to claim 1 wherein the combustion chambers comprise an upper surface, a lower surface, first sidewall joining a first end of the upper surface to a first end of the lower surface, and a second sidewall joining a second end of the upper surface to a second end of the lower surface.

37. A wave rotor detonation engine of claim 36 wherein the sidewalls lie along the radial direction of the rotor.

38. A wave rotor detonation engine of claim 37 wherein the sidewalls are straight.

39. A wave rotor detonation engine of claim 36 wherein the sidewalls are curved in a plane perpendicular to a longitudinal axis of the rotor.

40. A wave rotor detonation engine of claim 1 wherein the combustion chambers are helically disposed about a longitudinal axis of the rotor.

41. A wave rotor detonation engine of claim 1 wherein the inlet zones are disposed circumferentially within the inlet port.

42. A wave rotor detonation engine of claim 1 wherein closure of the outlet end of the combustion chamber produces a compression wave traveling towards the inlet end of the combustion chamber, and the wave rotor detonation engine comprises a timing means for rotating the rotor such that the compression wave arrives proximate the first wall immediately after firing of the igniter.

43. A wave rotor detonation engine of claim 3 wherein opening of the outlet end of the combustion chamber produces an expansion wave traveling towards the inlet end of the combustion chamber, and the wave rotor detonation engine comprises a timing means for rotating the rotor such that the expansion wave arrives at the inlet end of the combustion chamber as the inlet end rotates past the first wall to communicate with the second inlet zone.

44. A wave rotor detonation engine of claim 1 wherein firing of the igniter produces a detonative shock wave traveling towards the outlet end of the combustion chamber, and the wave rotor detonation engine comprises a timing means for rotating the rotor such that the shock wave arrives at the outlet end of the combustion chamber as the outlet end rotates past the second wall to communicate with the at least one exhaust port.

45. A wave rotor detonation engine according to claim 5 comprising a motor for rotating the rotor, and a CPU operably connected to the motor, the igniter, and the enhancement injector for controlling the timing of the rotor rotation.

46. A wave rotor detonation engine according to claim 45 wherein closure of the outlet end of the combustion chamber produces a compression wave traveling towards the inlet end of the combustion chamber, and the CPU rotates the rotor such that the compression wave arrives proximate the first wall immediately after firing of the igniter.

47. A wave rotor detonation engine of claim 45 wherein opening of the outlet end of the combustion chamber produces an expansion wave traveling towards the inlet end of the combustion chamber, and the CPU rotates the rotor such that the expansion wave arrives at the inlet end of the combustion chamber as the inlet end rotates past the first wall to communicate with the second inlet zone.

48. A wave rotor detonation engine of claim 45 wherein closure of the outlet end of the combustion chamber produces a detonative shock wave traveling towards the outlet end of the combustion chamber, and the CPU rotates the rotor such that shock wave arrives at the outlet end of the combustion chamber as the outlet end rotates past the second wall to communicate with the at least one exhaust port.

49. A wave rotor detonation engine comprising:
   a housing including a first wall having at least one inlet port and a second wall having at least one exhaust port;
   a rotor rotatably mounted within the housing, the rotor comprising a plurality of combustion chambers, the chambers each having an inlet end for gaseous communication with the at least one inlet port and an exhaust end for gaseous communication with the at least one exhaust port;
   at least one inlet zone partition disposed at the inlet port for partitioning the inlet port into a plurality of inlet zones, wherein the inlet zones include a first inlet zone being solely an air input without a fuel injector; and
   at least one igniter disposed within the housing for igniting a combustible material within the combustion chambers.

50. A wave rotor detonation engine according to claim 49 wherein the plurality of inlet zones comprises a second inlet zone having an enhancement injector for injecting a combustion enhancer.

51. A wave rotor detonation engine according to claim 50 wherein the second inlet zone includes a fuel injector.

52. A wave rotor detonation engine according to claim 51 wherein the plurality of inlet zones comprises a third inlet zone intermediate to the first and second inlet zones, the third inlet zone having a fuel injector.

53. A wave rotor detonation engine according to claim 52 wherein the plurality of inlet zones comprises a fourth inlet zone adjacent to the third inlet zone, the fourth inlet zone having a fuel injector.

54. A wave rotor detonation engine according to claim 49 wherein the at least one inlet port has a first circumferential width and the at least one exhaust port has a second circumferential width, the first circumferential width and the second circumferential width being substantially equal.

55. A wave rotor detonation engine according to claim 49 wherein about ½ of the combustion chambers are in simultaneous gaseous communication with the at least one inlet port.

56. A wave rotor detonation engine according to claim 49 or 55 wherein about ½ of the combustion chambers are in simultaneous gaseous communication with the at least one exhaust port.

57. The wave rotor detonation engine according to claim 49 wherein about ¼ of the combustion chambers are in gaseous communication simultaneously with both the at least one exhaust port and the at least one inlet port.

58. A wave rotor detonation engine according to claim 49 wherein all of the combustion chambers are in simultaneous gaseous communication with the at least one exhaust port.

59. A wave rotor detonation engine according to claim 49 wherein the at least one inlet port subtends a circumferential width of about 180 degrees.

60. A wave rotor detonation engine according to claim 49 wherein the at least one exhaust port subtends a circumferential width of about 180 degrees.

61. A wave rotor detonation engine according to claim 49 wherein the at least one inlet port subtends a first circumferential width and the at least one exhaust port subtends a second circumferential width, the first circumferential width and the second circumferential width subtending a region of circumferential overlap of about 90 degrees.

62. A wave rotor detonation engine according to claim 49 wherein the at least one inlet port subtends a first circumferential width and the at least one exhaust port subtends a second circumferential width, the first circumferential width and the second circumferential width subtending a region of circumferential overlap of about ½ the first circumferential width.

63. A wave rotor detonation engine according to claim 62 wherein the first circumferential width is defined by a first leading-edge and a first trailing edge and the second circumferential width is defined by a second leading-edge and a second trailing edge, and wherein the region of overlap is disposed between the first leading-edge and the second trailing edge.

64. A wave rotor detonation engine according to claim 49 wherein the at least one inlet port subtends a circumferential width of about 90 degrees.

65. A wave rotor detonation engine according to claim 49 wherein the at least one exhaust port subtends a circumferential width of about 90 degrees.

66. A wave rotor detonation engine according to claim 49 wherein the at least one inlet port subtends a first circumferential width and the at least one exhaust port subtends a second circumferential width, the first circumferential width and the second circumferential width subtending a region of circumferential overlap of about 45 degrees.

67. A wave rotor detonation engine according to claim 49 wherein the number of inlet ports equals the number of exhaust ports.

68. A wave rotor detonation engine according to claim 49 having one inlet port and one exhaust port.

69. A wave rotor detonation engine according to claim 68 wherein the inlet port and the exhaust port each subtend a circumferential width of about 180 degrees.

70. A wave rotor detonation engine according to claim 69 wherein the inlet port circumferential width and the exhaust port circumferential width subtend a region of circumferential overlap of about 90 degrees.

71. A wave rotor detonation engine according to claim 49 having a first and a second inlet port and a first and a second exhaust port.

72. A wave rotor detonation engine according to claim 71 wherein each inlet port and each exhaust port subtends a circumferential width of about 90 degrees.

73. A wave rotor detonation engine according to claim 71 wherein the first inlet port and the first exhaust port subtend a region of circumferential overlap of about 45 degrees and the second inlet port and the second exhaust port subtend a region of circumferential overlap of about 45 degrees.

74. A wave rotor detonation engine according to claim 49 having one inlet port and one exhaust port, the exhaust port in simultaneous gaseous communication with all of the combustion chambers, the inlet port in simultaneous gaseous communication with about ⅔ of the combustion chambers.

75. A wave rotor detonation engine according to claim 49 wherein the at least one igniter comprises a hot gas source, an electromagnetic radiation source, a laser source, or a microwave radiation source, for igniting the combustible material.

76. A wave rotor detonation engine according to claim 49 wherein the number of igniters equals the number of inlet ports.

77. A wave rotor detonation engine according to claim 76 wherein each igniter is disposed proximate a respective inlet port such that each igniter communicates with the combustion chambers just after the combustion chambers have rotated past the respective inlet port.

78. A wave rotor detonation engine according to claim 49 wherein the number of igniters equals the number of exhaust ports.

79. A wave rotor detonation engine according to claim 78 wherein each igniter is disposed proximate a respective exhaust port such that each igniter communicates with the combustion chambers just after the combustion chambers have rotated past the respective exhaust port.

80. A wave rotor detonation engine according to claim 49 wherein the rotor comprises a cylindrical outer shroud defining an outer surface of the rotor, a cylindrical hub, and rotor vanes extending from the cylindrical hub to the outer shroud whereby the combustion chambers are formed.

81. A wave rotor detonation engine according to claim 49 wherein the combustion chambers have a substantially rectangular cross section in a plane containing a longitudinal axis of the rotor.

82. A wave rotor detonation engine according to claim 49 wherein the combustion chambers have a substantially rectangular cross section in a plane perpendicular to a longitudinal axis of the rotor.

83. A wave rotor detonation engine according to claim 49 wherein the combustion chambers have a substantially circular cross section in a plane perpendicular to a longitudinal axis of the rotor.

84. A wave rotor detonation engine according to claim 49 wherein the combustion chambers comprise an upper surface, a lower surface, first sidewall joining a first end of the upper surface to a first end of the lower surface, and a second sidewall joining a second end of the upper surface to a second end of the lower surface.

85. A wave rotor detonation engine of claim 81 wherein the sidewalls lie along the radial direction of the rotor.

86. A wave rotor detonation engine of claim 85 wherein the sidewalls are straight.

87. A wave rotor detonation engine of claim 85 wherein the sidewalls are curved in a plane perpendicular to a longitudinal axis of the rotor.

88. A wave rotor detonation engine of claim 49 wherein the combustion chambers are helically disposed about a longitudinal axis of the rotor.

89. A wave rotor detonation engine of claim 49 wherein the inlet zones are disposed circumferentially within the inlet port.

90. A wave rotor detonation engine of claim 49 wherein closure of the outlet end of the combustion chamber produces a compression wave traveling towards the inlet end of the combustion chamber, and the wave rotor detonation engine comprises a timing means for rotating the rotor such that the compression wave arrives proximate the first wall immediately after firing of the igniter.

91. A wave rotor detonation engine of claim 49 wherein opening of the outlet end of the combustion chamber produces an expansion wave traveling towards the inlet end of the combustion chamber, and the wave rotor detonation engine comprises a timing means for rotating the rotor such that the expansion wave arrives at the inlet end of the combustion chamber as the inlet end rotates past the first wall to communicate with the at least one inlet port.

92. A wave rotor detonation engine of claim 49 wherein firing of the igniter produces a detonative shock wave traveling towards the outlet end of the combustion chamber, and the wave rotor detonation engine comprises a timing means for rotating the rotor such that the shock wave arrives at the outlet end of the combustion chamber as the outlet end rotates past the second wall to communicate with the at least one exhaust port.

93. A wave rotor detonation engine according to claim 49 comprising a motor for rotating the rotor, and a CPU operably connected to the motor and the igniter for controlling the timing of the rotor rotation.

94. A wave rotor detonation engine according to claim 93 wherein closure of the outlet end of the combustion chamber produces a compression wave traveling towards the inlet end of the combustion chamber, and the CPU rotates the rotor such that the compression wave arrives proximate the first wall immediately after firing of the igniter.

95. A wave rotor detonation engine of claim 93 wherein opening of the outlet end of the combustion chamber produces an expansion wave traveling towards the inlet end of the combustion chamber, and the CPU rotates the rotor such that the expansion wave arrives at the inlet end of the combustion chamber as the inlet end rotates past the first wall to communicate with the at least one inlet port.

96. A wave rotor detonation engine of claim 93 wherein closure of the outlet end of the combustion chamber produces a detonative shock wave traveling towards the outlet end of the combustion chamber, and the CPU rotates the rotor such that shock wave arrives at the outlet end of the combustion chamber as the outlet end rotates past the second wall to communicate with the at least one exhaust port.

97. A method for creating detonative combustion in a wave rotor detonation engine comprising:
 a) rotating a rotor comprising a plurality of circumferentially spaced combustion chambers so that an inlet of a preselected combustion chamber is in gaseous communication with a first inlet zone of an inlet port;
 b) drawing air into the inlet from the first inlet zone, the air forming a buffer layer to inhibit combustion by any existing hot gases within the preselected combustion chamber;
 c) rotating the rotor so that the inlet is in gaseous communication with a second inlet zone of the inlet port, the second zone having a fuel injector;
 d) injecting fuel into the second inlet zone with the fuel injector, and drawing a first combustible mixture of air and fuel into the inlet from the second inlet zone;
 e) rotating the rotor so that the inlet is substantially gaseously sealed against a first wall of a rotor housing whereby the inlet is in communication with an igniter mounted at the first wall;
 f) igniting the combustible mixture within the preselected combustion chamber to cause detonative combustion whereby a shock wave is generated traveling from the inlet towards an outlet of the combustion chamber; and
 g) rotating the rotor so that the outlet is in gaseous communication with an exhaust port just as the shock wave reaches the outlet.

98. A method for creating detonative combustion of claim 97 wherein the combustible mixture is formulated to enhance initiation of detonative combustion.

99. A method for creating detonative combustion of claim 98 or 97 comprising rotating the rotor so that the inlet is in gaseous communication with a third inlet zone of the inlet port, the third inlet zone having a fuel injector and injecting fuel into the third inlet zone with the fuel injector, and drawing a second combustible mixture of air and fuel into the inlet from the third inlet zone.

100. A method for creating detonative combustion of claim 99 comprising rotating the rotor so that the inlet is in gaseous communication with a fourth inlet zone of the inlet port, the fourth inlet zone having a fuel injector and injecting fuel into the fourth inlet zone with the fuel injector, and drawing a third combustible mixture of air and fuel into the inlet from the fourth inlet zone.

101. A method for creating detonative combustion of claim 97 wherein the communication between the outlet and the exhaust port of step "g" creates an expansion wave within the combustion chamber traveling from the outlet towards the inlet.

102. A method for creating detonative combustion of claim 101 wherein step "a" is timed such that the inlet is brought in gaseous communication with the first inlet zone just as the expansion wave arrives at the inlet.

103. A method for creating detonative combustion of claim 97 comprising the step of substantially gaseously sealing an outlet of the preselected combustion chamber while the inlet is in gaseous communication with a preselected inlet zone, whereby a compression wave is generated at the outlet and travels towards the inlet.

104. A method for creating detonative combustion of claim 103 wherein step "f" is timed such that the compression wave arrives just as the shock wave is being generated.

105. A method for creating detonative combustion of claim 97 wherein the steps are repeated sequentially for succeeding combustion chambers.

106. A method for creating detonative combustion of claim 97 wherein the combustion chambers are helically disposed about longitudinal axis of the rotor, and wherein combustion within the chambers promotes rotation of the rotor.

107. A method for creating detonative combustion of claim 97 wherein the second inlet zone comprises an enhancement injector for injecting a combustion enhancing material and wherein step "d" comprises injecting the combustion enhancing material into the second inlet zone and drawing the combustion enhancing material into the inlet.

108. A method for creating detonative combustion of claim 98 or 107 wherein the combustion enhancing material comprises a fuel or an oxidant.

109. A wave rotor detonation engine comprising:
  a rotor mounted within a housing having a first wall and a second wall, the rotor comprising a plurality of combustion chambers, the chambers each having an inlet end proximate the first wall and an exhaust end proximate the second wall;
  a plurality of inlets disposed adjacent one another and in communication with the inlet ends of the combustion chambers, the inlets adapted to charge the combustion chambers with two or more combustible materials of differing composition prior to combustion; and
  at least one igniter disposed within the housing for igniting the combustible materials within the combustion chambers.

110. A wave rotor detonation engine according to claim 109 wherein the plurality of inlets comprises a first inlet comprising a fuel injector.

111. A wave rotor detonation engine according to claim 110 wherein the plurality of inlets comprises a second inlet being solely an air input without a fuel injector.

112. A wave rotor detonation engine according to claim 111 wherein the plurality of inlets comprises a third inlet intermediate to the first and second inlets, the third inlet having a fuel injector.

113. A wave rotor detonation engine according to claim 111 wherein the first inlet comprises an enhancement injector for delivering a combustion enhancer into a selected chamber in gaseous communication with the first inlet.

114. A wave rotor detonation engine of claim 109 wherein closure of the outlet end of the combustion chamber produces a compression wave traveling towards the inlet end of the combustion chamber, and the wave rotor detonation engine comprises a timing means for rotating the rotor such that the compression wave arrives proximate the first wall immediately after firing of the igniter.

115. A wave rotor detonation engine of claim 111 wherein opening of the outlet end of the combustion chamber produces an expansion wave traveling towards the inlet end of the combustion chamber, and the wave rotor detonation engine comprises a timing means for rotating the rotor such that the expansion wave arrives at the inlet end of the combustion chamber as the inlet end rotates past the first wall to communicate with the second inlet.

116. A wave rotor detonation engine of claim 109 wherein firing of the igniter produces a detonative shock wave traveling towards the outlet end of the combustion chamber, and the wave rotor detonation engine comprises an exhaust port at the second wall and comprises a timing means for rotating the rotor such that the shock wave arrives at the outlet end of the combustion chamber as the outlet end rotates past the second wall to communicate with the exhaust port.

* * * * *